United States Patent
Jahnke et al.

(10) Patent No.: US 7,778,361 B1
(45) Date of Patent: Aug. 17, 2010

(54) FEED FORWARD METHOD FOR NICAM DECODE

(75) Inventors: Steven R. Jahnke, Tokyo (JP); Mikio Takano, Chiba (JP)

(73) Assignee: Texas Instruments Incorporated, Dallas, TX (US)

( * ) Notice: Subject to any disclaimer, the term of this patent is extended or adjusted under 35 U.S.C. 154(b) by 893 days.

(21) Appl. No.: 11/206,408

(22) Filed: Aug. 17, 2005

(51) Int. Cl.
*H03D 3/22* (2006.01)

(52) U.S. Cl. ............ 375/332; 375/326; 708/142; 708/231; 708/271; 708/404

(58) Field of Classification Search ......... 375/229–233, 375/332, 326; 708/172, 231, 271, 272, 404, 708/323, 490; 381/1, 22
See application file for complete search history.

(56) References Cited

U.S. PATENT DOCUMENTS

| 5,345,440 | A | * | 9/1994 | Gledhill et al. | ......... 370/210 |
| 5,532,762 | A | * | 7/1996 | Sakai et al. | ......... 348/738 |
| 6,092,179 | A | * | 7/2000 | Greenberger et al. | ...... 712/35 |
| 7,397,758 | B1 | * | 7/2008 | Hart et al. | ......... 370/208 |

* cited by examiner

*Primary Examiner*—David C Payne
*Assistant Examiner*—Rahel Guarino
(74) *Attorney, Agent, or Firm*—Mirna Abyad; W. James Brady; Frederick J. Telecky, Jr.

(57) ABSTRACT

A method and apparatus for decoding digital quadrature phase shift keying data includes converting and intermediate frequency signal from an analog signal to a digital signal and digitally processing the digital signal to detect and decode the digital quadrature phase shift keying and extract encoded data.

11 Claims, 2 Drawing Sheets

FEED FORWARD METHOD FOR NICAM DECODE

TECHNICAL FIELD OF THE INVENTION

The technical field of this invention is decoding NICAM encoded audio data.

BACKGROUND OF THE INVENTION

It is desirable to provide a Near Instantaneous Companded Audio Multiplex (NICAM) system that it can be integrated into a large SOC (system on a chip) efficiently. The method of this invention allows the demodulation and decoding of NICAM without requiring any phase locked loops (PLLs) or feedback. This invention can be built using only a standard A/D converter, a digital signal processor (DSP) core and logic gates. Because this method does not include a PLL or additional analog demodulation circuitry, it permits efficient implementation in an advanced digital process.

At the receiver, the tuner converts the video carrier and the F.M. sound inter-carrier to respective intermediate frequencies (IF) of 39.5 MHz and 33.5 MHz in the normal way. The NICAM carrier (which is 6.552 MHz away from the video carrier) is converted to an intermediate frequency of NICAM IF of 39.5 MHz-6.552 MHz=32.948 MHz or approximately 32.95 MHz.

This IF signal is demodulated by a digital quadrature phase shift keying (DQPSK) detector and applied to the NICAM decoder which reverses the transmitter encoding to recreate the 14-bit sample code words for each channel. A digital-to-analog converter reproduces the original analog two-channel, left and right sound waveforms.

FIG. 1 illustrates the basic elements of NICAM sound reception in a TV receiver. Antenna 110 receives radio frequency signals and supplies them to tuner 120. Tuner 120 selects the desired radio frequency signal and supplies an intermediate frequency (IF) signal to special surface acoustic wave (SAW) filter 130. SAW filter 130 separates the video and sound IF outputs. A sharp cut-off removes the two sound IFs, 33.5 MHz for mono and 32.95 MHz for NICAM, from the video 39.5 MHz carrier. SAW filter 130 generates separate outputs for the video and NICAM IF carrier. SAW filter 130 also provides for a very narrow peak at 39.5 MHz. Sound. IF demodulator 140 uses the 39.5 MHz pilot frequency to beat with the FM sound IF signal to produce 6 MHz FM mono audio signal and with the NICAM IF to produce 6.552 MHz DQPSK carriers. Sound IF demodulator 140 uses sharply tuned filters to separate the two sound carriers. The FM carrier goes to a conventional FM processing channel 155 for mono sound. The 6.552 MHz NICAM phase modulated carrier goes to a NICAM processing section. This includes three basic parts. DQPSK decoder 160 recovers the 728 kbit per second serial data stream from the 6.552 MHz carrier. NICAM decoder 170 de-scrambles, de-interleaves, corrects and expands the data stream back into 14-bit sample code words. Finally, digital-to-analog converter 180 reproduces the original analog signals for each channel.

DQPSK demodulator 160 works on the same principle as a frequency modulation (FM) detector. A variation in phase or frequency produces a variation in the direct current (DC) output. In the case of two-phase modulation, the DC output of the detector has two distinct values representing logic 1 and logic 0. However, in the case of quadrature, i.e. four-phase modulation, the output of the detector is ambiguous. The same output for a 90° phase shift is obtained as that for a phase shift of 270°. This is similar for phase shifts of 0° and 180°. In order to resolve the ambiguities, a second phase detector operating in quadrature (90°) is typically used.

FIG. 2 illustrates the main elements of a DQPSK demodulator 160 of the prior art. The input NICAM 23.95 MHz IF signal in input to band pass filter 150. The output of band pass filter 150 supplies the inputs of both in-phase phase detector (PDI) 210 and quadrature phase detector (PDQ) 220. The output of in-phase phase detector 210 supplies the input of low pass filter 215. The output of quadrature phase detector 220 supplies the input of low pass filter 225. The filtered outputs from the two phase detectors are the data I and data Q. These feed data recovery circuit 170 which reproduces the original serial data stream. In the NICAM standard this is a 728-bit serial bit stream. Carrier recovery block 230 recovers the 6.552 MHz reference carrier frequency from the in-phase filtered signal. Carrier recovery block 230 supplies this recovered carrier to in-phase phase detector 210 to beat with the input. Carrier recovery block 210 supplies 90° phase shifter 235 which supplies this phase shifted signal as the beat carrier to quadrature phase detector 220.

FIG. 3 illustrates an example of the quadrature encoding of the NICAM standard. Two bits of data are encoded in a phase shift of the carrier. A 0° phase shift encodes the binary pair "00." A 90° phase shift encodes the binary pair "01." A 180° phase shift encodes the binary pair "10." Finally, a 270° phase shift encodes the binary pair "11." The decoding task is to unambiguously determine the transmitted phase shift to recover the encoded bit pair.

This prior art technique has disadvantages making construction of low-cost systems difficult. A DQPSK demodulator such as illustrated in FIG. 2 typically requires a phase locked loop (PLL) in carrier recovery. In current technology it is difficult to construct a single integrated circuit including both the analog components needed for such as PLL and digital data processing circuits. A typical TV requiring NICAM demodulation will include a high-performance digital signal processor (DSP) for many image and audio tasks. Because of the difficulty of constructing a single integrated circuit including both a PLL and a DSP, more circuits are needed for the TV system. This results in increased cost.

SUMMARY OF THE INVENTION

This invention uses a feed-forward technique. This allows for variable and efficient partitioning between gates in the analog front end (AFE) subsection and DSP code. This permits optimizing between gate count of circuits and DSP MIPS. The optimization of this invention is easier than if the decoder used a feedback design.

Algorithmically, we will perform the NICAM carrier removal/demodulation and decoding using digital signal processing techniques. There are a couple of ways to implement this, but fundamentally, it will require immediate A/D conversion, logic gates on the front end for any of the high bit rate calculations (such as decimatation filtering) and then DSP software for the low bit rate and decision making calculations.

BRIEF DESCRIPTION OF THE DRAWINGS

These and other aspects of this invention are illustrated in the drawings, in which.

DETAILED DESCRIPTION OF PREFERRED EMBODIMENTS

NICAM is a TV audio standard used in Europe and China. It involves digital modulation using DQPSK, very similar to current wireless networking or digital radio modulation. Current methods to demodulate NICAM operate in the analog domain, using a tight PLL feedback loop to recover the carrier. This technique is used because typical NICAM devices use an analog semiconductor manufacturing process.

At first glance, it would appear that doing the very high speed carrier removal in the analog domain and outputting the carrier-removed data to an A/D converter to be digitally decoded is a cost efficient DQPSK demodulation implementation. Using a signal processing algorithm to perform the carrier removal and demodulation at radio-frequencies (in the hundreds of MHz or GHz) requires significant DSP processing or very high speed gates. However, the NICAM carrier frequency is only 6.552 MHz. Current circuit densities in digital circuits, such as 130 nm, are sufficient to permit integration of a suitable A/D converter, specialized logic gates (ASIC logic) and a DSP core in the same process. Thus it is more cost effective in silicon to perform this algorithm completely in the digital domain. At the 130 nm process node, it is difficult to perform complex analog integration such as required for a carrier recovery PLL well. The amount of audio post processing required in modern TVs already require a high performance DSP core with large on-chip RAM. A digital signal processing based demodulation technique could perform both the traditional analog functions of carrier removal and audio post processing functions of a higher end TV audio system in a single integrated circuit more cost effectively. Without moving the NICAM demodulation to this single integrated circuit, either multiple devices (one analog, one digital) would be required or the amount of digital audio post processing that could be performed would be severely.

Figure 1:
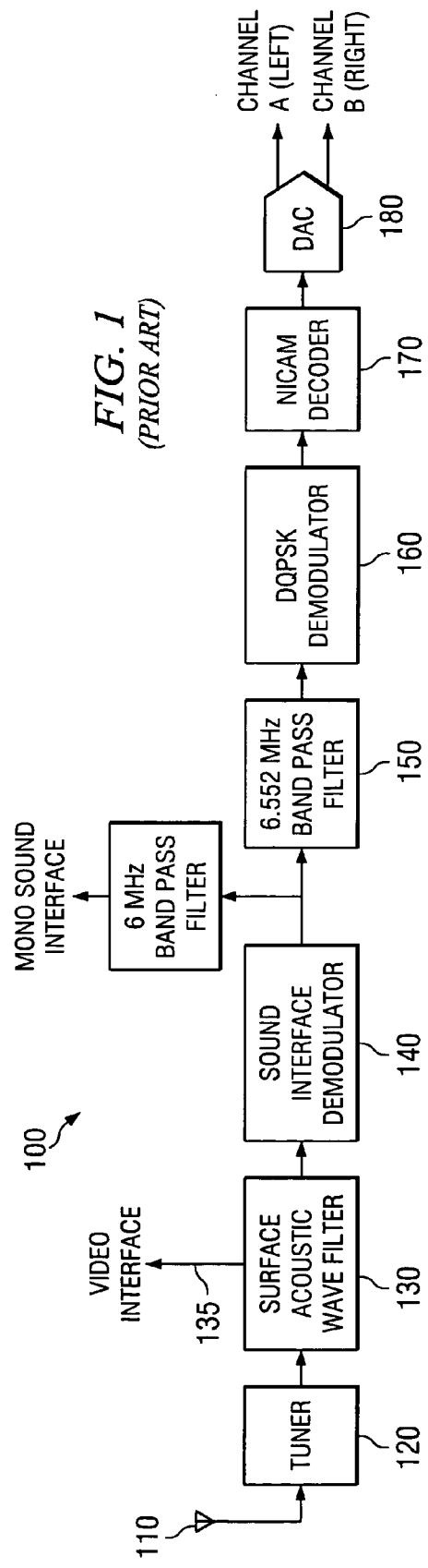
FIG. 1 illustrates the basic elements of NICAM sound reception in a TV receiver (prior art)
Figure 2:
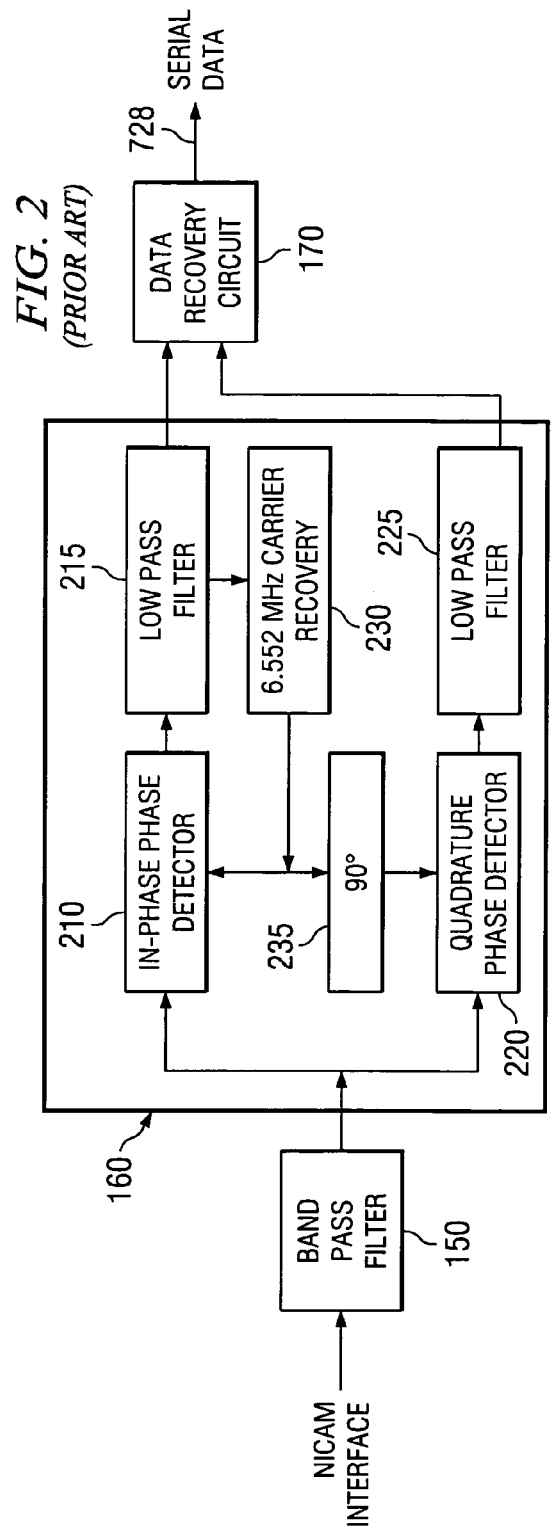
FIG. 2 illustrates the main elements of a DQPSK demodulator of the prior art.
Figure 3:
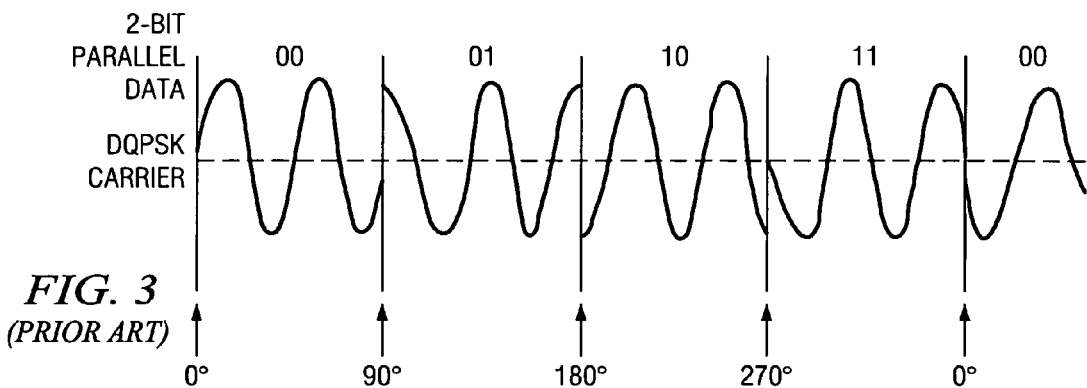
FIG. 3 illustrates an example of the quadrature encoding of the NICAM standard.
Figure 4:
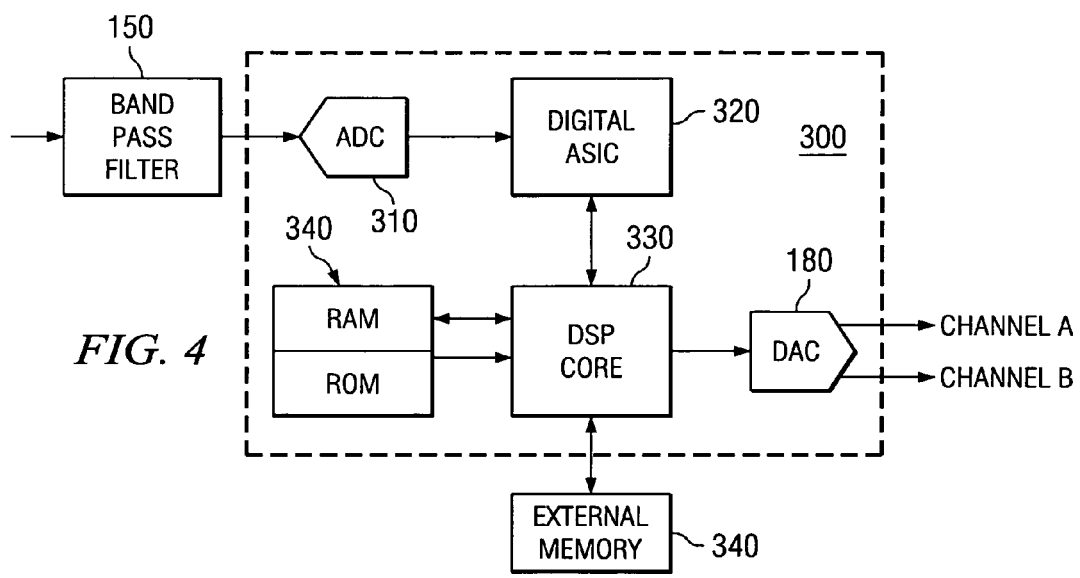
FIG. 4 illustrates in part the construction of a system performing NICAM decoding in accordance with this invention.

FIG. 4 illustrates in part the construction of a system performing NICAM decoding in accordance with this invention. Integrated circuit 300 performs the DQPSK demodulation and the NICAM decoding as well as other post-processing functions. Integrated circuit 300 includes analog to digital converter 310 which receives the 6.522 MHz signal from band pass filter 150. The digitized sample output from analog to digital converter 310 passes to digital ASIC (Application Specific Integrated Circuit) 320. Digital ASIC 320 is constructed to handle pre-processing and buffering tasks that occur too fast to be handled by DSP core 330 or are best performed in special purpose hardware. It is contemplated that digital ASIC 320 will have some controllable functions that are set by DSP core 330.

DSP core 330 performs the major signal processing functions including DQPSK demodulation and NICAM decoding. In a typical embodiment of this invention DSP core 330 would handle other signal processing functions. DSP core 330 receives the preprocessed data from digital ASIC 320 in real time. DSP core 330 also sends signals to digital ASIC 320 to set modes, change parameters and the like. DSP core 300 is bidirectionally coupled to memory 340. Memory 340 includes both read only memory (ROM) storing the program controlling DSP core 330 and random access read/write memory (RAM) which temporarily stores intermediate results during signal processing. DSP core 330 supplies converted digital data to digital to analog converter 180 which produces the two audio channel signals (Ch A and Ch B). Note that digital to analog converter 180 is embodied in integrated circuit 300. DSP core 330 may be bidirectionally coupled to external memory 340 which is not a part of integrated circuit 300.

Figure 5:
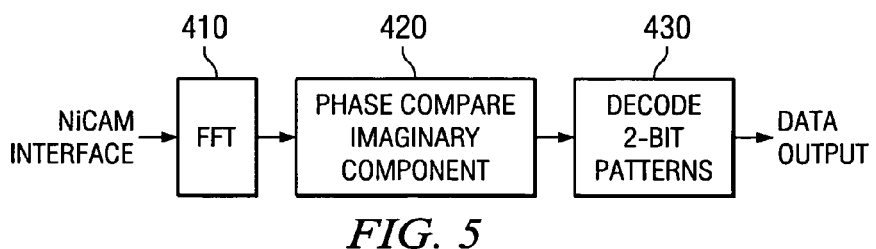
FIG. 5 illustrates a first example DQPSK demodulation that can be performed via a DSP.
Figure 6:
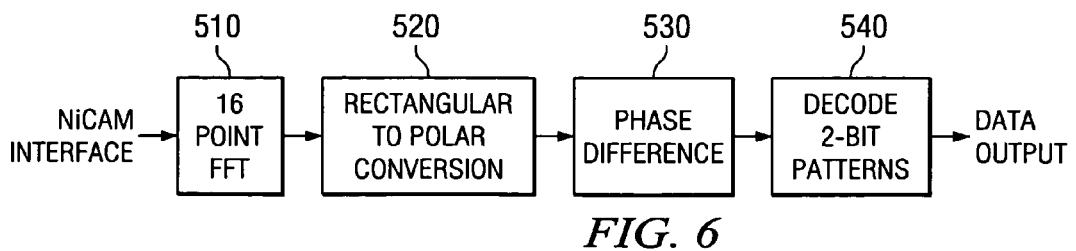
FIG. 6 illustrates a second example DQPSK demodulation that can be performed via a DSP.

There are various methods to do DQPSK demodulation using digital signal processing. FIGS. 5 and 6 illustrate examples.

FIG. 5 illustrates an example DQPSK demodulation that can be performed via a DSP. The digitized NICAM intermediate frequency signal is subjected to a Fast Fourier Transform (FFT) in processing block 410. Phase compare imaginary component processing block 420 drops the real component of the FFT output and uses the imaginary component to do a phase compare. Processing block 430 receives the detected phase comparison and ties it to the appropriate 2-bit bit pattern.

FIG. 6 illustrates a second example DQPSK demodulation that can be performed via a DSP. The digitized NICAM IF signal is subjected to a 16-point FFT in processing block 510. The resulting complex frequency domain data is transformed from rectangular coordinates to polar coordinates in processing block 520. Processing block 530 detects phase discontinuities that indicate one of the encoded 2-bit data pairs. Processing block 540 receives the detected phase discontinuity data and ties it to the appropriate 2-bit bit pattern.

Other and perhaps much better signal processing algorithms may also exist.

What is claimed is:

1. A method of a digital signal processor of decoding digital quadrature phase shift keying data comprising the steps of:

receiving radio frequency signals in the digital signal processor;

determining an intermediate frequency signal of the received radio frequency signal;

converting the intermediate frequency signal from an analog signal to a digital signal; and digitally processing the digital signal to detect and decode the digital quadrature phase shift keying and extract encoded data, wherein said step of digitally processing the digital signal comprises:

performing a Fast Fourier Transform on the digital signal of the converted analog signal relating to the radio frequency;

determining a 2-bit code for corresponding detected phase differences; and generating a digital output corresponding to determined 2-bit codes, wherein said digital signal processing performs traditional analog functions of carrier removal and audio post processing functions in a single integrated circuit.

2. The method of claim 1, wherein:

said step of digitally processing the digital signal further comprises:

detecting the phase difference between successive imaginary components of the Fast Fourier Transform data.

3. The method of claim 1, wherein:

said step of digitally processing the digital signal further comprises:

converting the Fast Fourier Transform data from rectangular coordinates to polar coordinates; and detecting phase differences in the polar coordinate data.

4. The method of claim 1, further comprising the step of converting the digital output from a digital signal to an analog signal.

5. An integrated circuit for decoding digital quadrature phase shift keying data comprising:

an analog to digital converter having an analog input connected externally to said integrated circuit and a digital output the intermediate frequency signal from an analog signal to a digital signal;

a digital signal processor core having a digital input connected to said digital output of said analog to digital converter, wherein said digital signal processor performs traditional analog functions of carrier removal and audio post processing functions in a single integrated circuit;

a read only memory connected to said digital signal processor core storing a control program to control said digital signal processor to detect and decode digital quadrature phase shift keying and extract data encoded in a signal supplied to said analog input of said analog to digital converter wherein said control program stored in said read only memory controls said digital signal processor core to perform a Fast Fourier Transform on the digital signal relating to a radio frequency at said digital output of said analog to digital converter, determine a 2-bit code for corresponding detected phase differences, and generate a digital output corresponding to determined 2-bit codes.

6. The integrated circuit of claim 5, wherein:

said control program stored in said read only memory controls said digital signal processor core to further detect the phase difference between successive imaginary components of the Fast Fourier Transform data.

7. The integrated circuit of claim 5, wherein:

said control program stored in said read only memory controls said digital signal processor core to further convert the Fast Fourier Transform data from rectangular coordinates to polar coordinates, detect phase differences in the polar coordinate data.

8. The integrated circuit of claim 5, further comprising:

a digital to analog converter having a digital input receiving said digital output of said digital signal processor core and an analog output connected externally to said integrated circuit.

9. The integrated circuit of claim 5, further comprising:

a random access read/write memory bidirectionally connected to said digital signal processor core.

10. The integrated circuit of claim 5, wherein:

said digital processor core includes an external memory connection external of said integrated circuit for bidirectional connection to an external memory.

11. The integrated circuit of claim 5, further comprising:

an application specific integrated circuit block having a digital input connected to said digital output of said analog to digital converter and a digital output connected to said digital input of said digital signal processor core, said application specific integrated circuit block preprocessing said digital output of said analog to digital converter.

* * * * *